R. J. M. King,
Horse Power.
No. 102,015.  Patented Apr. 19, 1870.
Figure 1 —
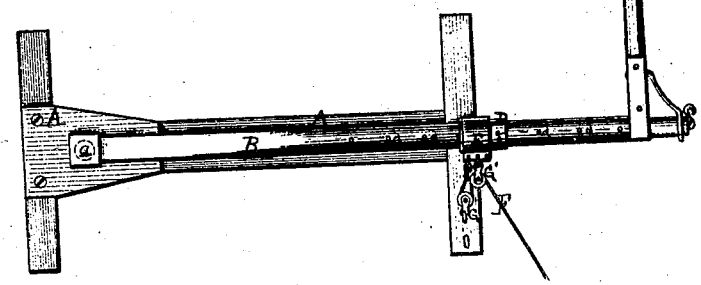
Figure 2 —
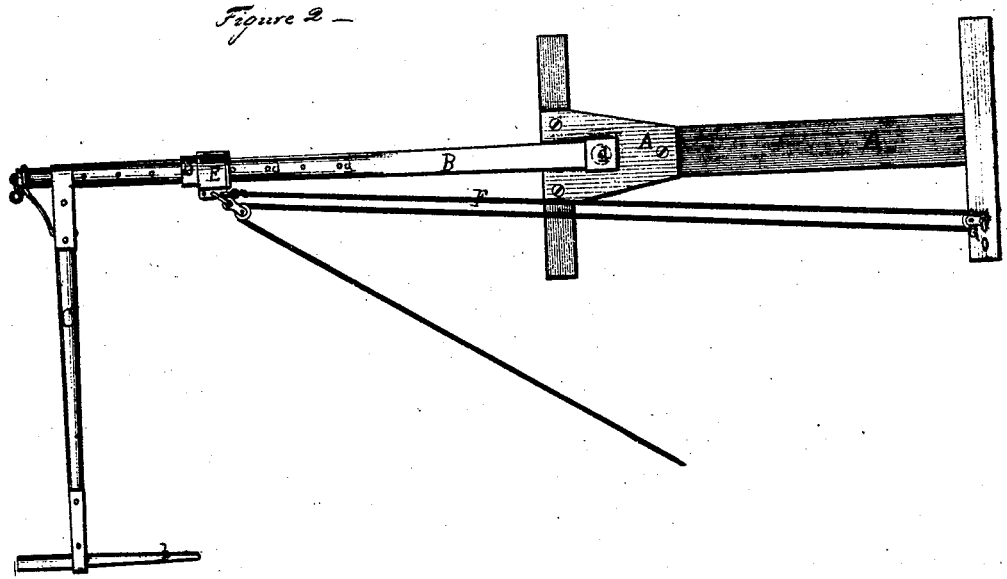

UNITED STATES PATENT OFFICE.

RICHARD J. M. KING, OF YPSILANTI, MICHIGAN.

IMPROVED HORSE-POWER.

Specification forming part of Letters Patent No. 102,015, dated April 19, 1870.

*To all whom it may concern:*

Be it known that I, RICHARD J. M. KING, of Ypsilanti, in the county of Washtenaw and State of Michigan, have invented a new and useful Improvement in Sweep Horse-Powers; and I do declare that the following is a true and accurate description thereof, reference being had to the accompanying drawings, and to the letters of reference marked thereon, and being a part of this specification, in which—

Figure 1 is a plan of my sweep as when commencing to elevate a load; and Fig. 2 is a plan of the same, showing the position of the sweep after the load is elevated.

Like letters indicate like parts in each figure.

The nature of this invention relates to the construction of a sweep-power by means of which the load may be elevated to any height not exceeding twice the length of the sweep at each revolution thereof, using a single block, and which may be raised to greater heights by the employment of double and treble sleeved blocks.

It consists in the peculiar construction and arrangement, on a sweep, of an adjustable sleeve, on which is in turn sleeved a rotating draft-box; also, in combination therewith, the arrangement of a draft-pole and pulleys, operating as hereinafter more fully shown and set forth.

In the drawings, A represents the bed-piece, on which the sweep B is journaled at *a*.

C is a draft-pole journaled on the outer end of the sweep, and is provided with a rigid single-tree, *b*. The horse is attached to the end of the sweep with a holdback-strap from his collar to the outer end of the single-tree *b*, and a guide-line from his bridle to the inner end of the single-tree.

D is a metallic sleeve, adjustable on the sweep by a pin, *c*, passing through it and any of the holes *d* in the body of the sweep.

E is a draft-box sleeved on the sleeve D, between its flange and pin, rotating freely.

F is a draft-rope attached to the lip of the draft-box, passing thence under a snatch-block, G, and through suitable guide-pulleys to the top of the building, or to wherever it is desired to elevate the material, and thence down to the load.

Suppose that material is to be raised to the second story of a building, at an elevation of twenty feet from the ground. A suitable crane, derrick, or shears is placed in position, and the draft-rope arranged as above described. The sleeve is then moved out on and secured to the sweep at a point ten feet from its fulcrum. The rope is then adjusted to the proper length—that is to say, when the sweep is in the position shown in Fig. 1 the end to which the barrow, box, or other receptacle to contain the material is attached shall be on the ground. The horse is then started to make a revolution of the sweep. When he makes half the distance, as shown in Fig. 2, the load is elevated, and he is stopped until the material is removed, when he completes the circuit, bringing the receptacle to the ground again. If the rope were secured directly to the sweep, at each circuit thereof it would be coiled around it. Now, as the sweep passes the half-center in line of draft the draft-box makes a half-rotation on the sleeve and overcomes the difficulty. If it is desired to stop the horse at an intermediate point between the ground and top centers of the sweep, the holdback-strap referred to enables him to counteract the tendency of the load to move the sweep in lowering the receptacle.

When it is desired to elevate material to a height more than double the length of the sweep, the rope, instead of being secured to the draft-box, is rove through a pulley attached thereto and its end secured to the bed-piece near the snatch-block.

I do not intend to confine myself in the use of this power to the purpose herein named, as it is equally applicable to the elevation and storing of hay and other purposes.

What I claim as my invention, and desire to secure by Letters Patent, is—

In sweep horse-powers, the bed-piece A, sweep B, draft-pole C, sleeve D, draft-box E, rope F, and suitable guide-pulleys, constructed and arranged to operate as and for the purposes set forth.

RICHARD J. M. KING.

Witnesses:
 H. F. EBERTS,
 H. S. SPRAGUE.